Sept. 22, 1970 F. E. HAYS Re. 26,950
STEAM-VACUUM GENERATOR FOR RUG AND UPHOLSTERY CLEANING
Original Filed Sept. 8, 1964 3 Sheets-Sheet 1
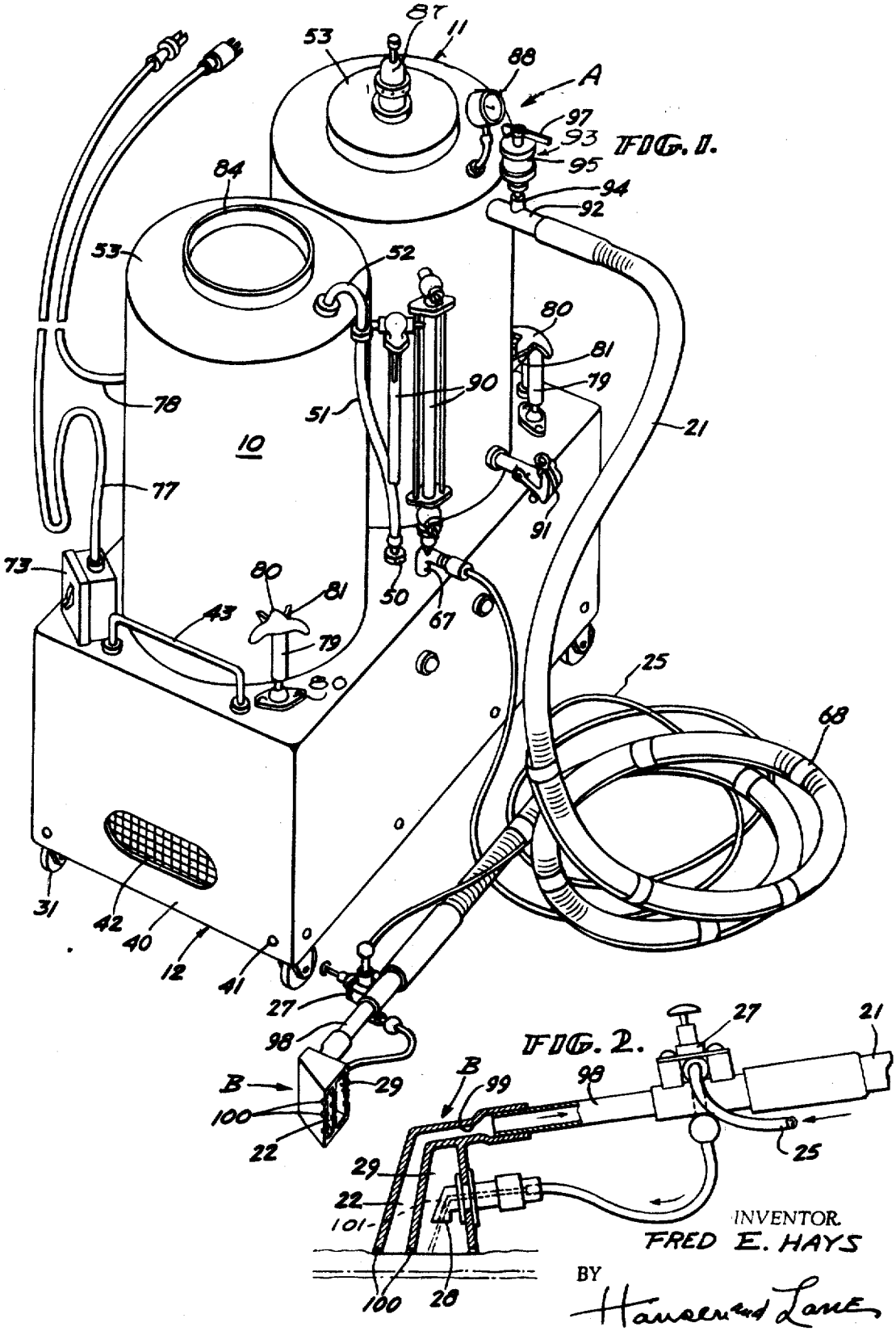
INVENTOR.
FRED E. HAYS
BY Hanaen and Lane
HIS ATTORNEYS.

STEAM-VACUUM GENERATOR FOR RUG AND UPHOLSTERY CLEANING

Original Filed Sept. 8, 1964 3 Sheets-Sheet 2

INVENTOR.
FRED E. HAYS

BY Hansen and Lane
HIS ATTORNEYS.

STEAM-VACUUM GENERATOR FOR RUG AND UPHOLSTERY CLEANING

Original Filed Sept. 8, 1964 3 Sheets-Sheet 3

INVENTOR.
FRED E. HAYS

BY
Hansen and Lane
HIS ATTORNEYS.

United States Patent Office

Re. 26,950
Reissued Sept. 22, 1970

26,950

STEAM-VACUUM GENERATOR FOR RUG AND UPHOLSTERY CLEANING

Fred E. Hays, 1137 Los Pueblos Road,
Santa Barbara, Calif. 93103

Original No. 3,262,146, dated July 26, 1966, Ser. No. 394,749, Sept. 8, 1964. Application for reissue July 22, 1968, Ser. No. 754,508
Int. Cl. A47l *11/30*
U.S. Cl. 15—321 4 Claims

Matter enclosed in heavy brackets [ ] appears in the original patent but forms no part of this reissue specification; matter printed in italics indicates the additions made by reissue.

*ABSTRACT OF THE DISCLOSURE*

*This invention relates to a cleaning apparatus for applying high pressure steam to one chamber of a two chamber cleaning nozzle and simultaneously creating a vacuum in the other chamber of the cleaning nozzle. The apparatus includes a base having two tanks mounted thereon, one of said tanks holding a cleaning solution, said one tank being connected to a pump which in turn is connected to a steam generating means the other tank having a baffle separating arrangement therein and said second tank being connected to a vacuum producing pump. The outlet from the steam generating means is connected by hose means to one chamber of a two chamber cleaning nozzle the second tank having an inlet connected by a hose to the other chamber of said cleaning nozzle.*

The present invention relates to rug and upholstery cleaning mechanism, and pertain more particularly to a mechanism for supplying high pressure steam of a solvent-containing solution to one chamber of a two-chamber cleaning nozzle, and simultaneously creating a vacuum in the other chamber of the nozzle, means being provided to condense and collect detergent vapor returned in a vacuum line from the nozzle.

In the cleaning of rugs and upholstery, it has been found effective to discharge a jet of pressurized steam of a solution containing a vaporizable solvent into the pile, nap or weave of a fabric to be cleaned, and to immediately thereafter apply suction to the fabric to withdraw the steam and condensate therefrom, together with the dirt loosened thereby, from the fabric.

An object of the present invention is to provide an improved mechanism for supplying steam from a solvent-containing solution at substantial pressure to a flexible hose line connected to one portion of a cleaning nozzle, and to provide suction for a vacuum line connected to another portion of such cleaning nozzle, together with means for condensing and separating, from steam and air returned in the vacuum line, solvent vapors and dirt entrained therein.

Another object of the invention is to provide an improved simplified two-tank mechanism for supplying under substantial pressure steam from a solvent bearing solution contained in one of the tanks, and for maintaining a controlled vacuum in the other tank, means being provided in the other tank for condensing and separating vapors and condensate droplets entrained in an air stream flowing into the other tank through a vacuum hose mounted thereon.

Another object of the invention is to provide an improved and simplified mechanism for supplying high pressure steam to one hose line for connection to one chamber of a two chamber rug and upholstery cleaning nozzle, and to provide suction and vapor condensing and separating mechanism for connection to a vacuum hose line to be connected to the other chamber of such nozzle.

The foregoing objects and advantages of the invention will be apparent from the following description and the accompanying drawings, wherein:

FIG. 1 is a perspective view of an illustrative mechanism embodying the invention, portions being broken away.

FIG. 2 is an enlarged, fragmentary view, partly in side elevation and partly in medial section, of one type of nozzle with which the present invention may be employed.

BRIEF DESCRIPTION

Figure 3:
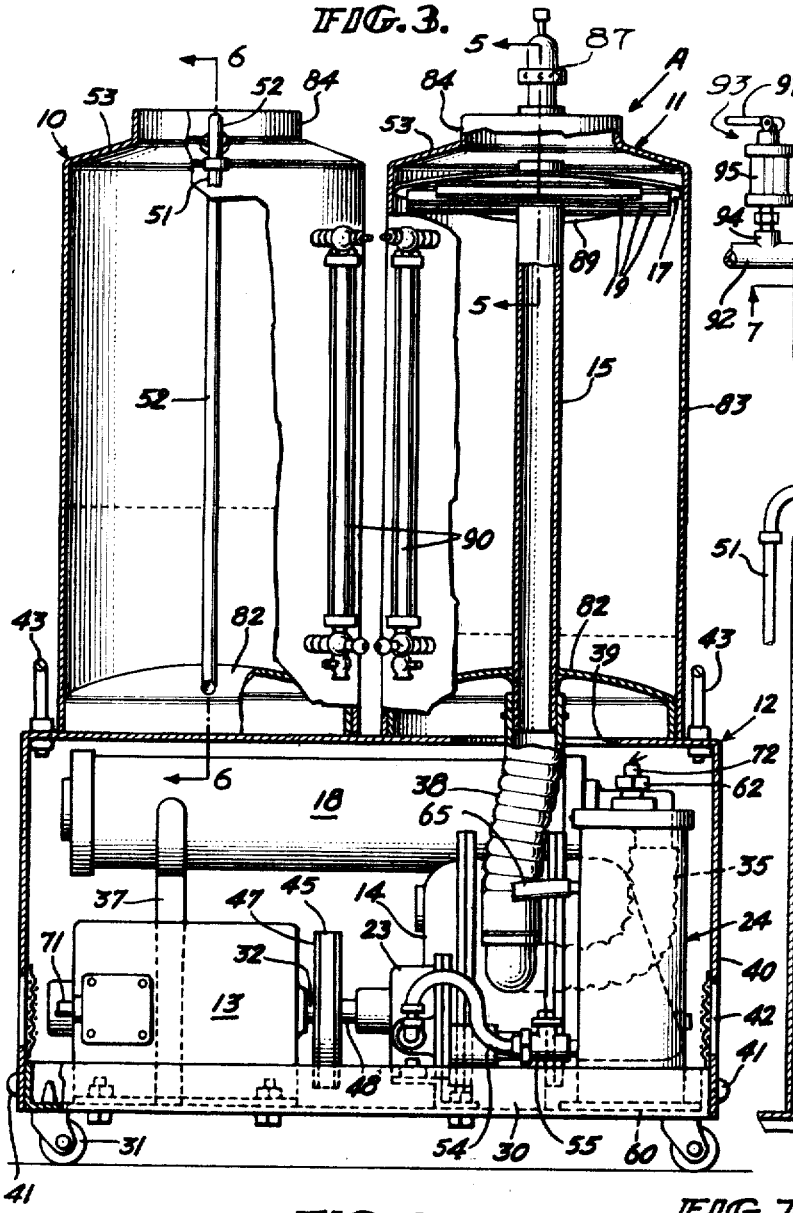
FIG. 3 is a longitudinal, vertical, medial sectional, view of the mechanism shown in FIG. 1, portions being broken away.

Briefly, the illustrative form A of the invention comprises a liquid tank 10 and a vacuum tank 11 mounted on a base structure 12 housing a drive motor 13 and other mechanism to be described herein. The motor 13 drives a suction blower 14, the intake side of which is connected to tube 15 which communicates with the interior of the vacuum tank above a sloping baffle 17 therein, while the discharge side of the vacuum blower discharges to the atmosphere through a silencer 18.

The baffle 17 has a plurality of drip flanges 19 on its under side, and its lower edge is bent downwardly and spaced from the side of the vacuum tank to provide an air passage 20. A vacuum hose 21 from one chamber 22 of a two-chamber cleaning nozzle B opens into the vacuum tank 11 directly below the higher side of the baffle 17.

A liquid pump 23 is also driven by the motor 13, and is connected to draw liquid from the liquid tank 10, and to feed the liquid under pressure to a steam generator 24, which converts the liquid fed thereto into steam, which is discharged through a steam hose 25 and control valve 27 to a spray head 28 in the other chamber 29 of the nozzle B.

DETAILED DESCRIPTION

Referring to the drawings in greater detail, the two-tank mechanism A embodying the present invention comprises a shallow base pan 30 supported by swiveled castors 31. Mounted on the base pan 30 is the drive motor 13, which is a conventional electrical motor of suitable power and speed, with its drive shaft 32 connected co-axially, by a conventional flexible coupling 33, to the driven shaft 34 of the suction blower 14. The latter preferably is a positive displacement type such as a well known Rootes blower. The specific type of suction blower employed is not material to the invention, and since several well known types are suitable for the purpose, the details thereof are not illustrated or described herein.

The outlet or high pressure side of the suction blower 14 communicates through a tube 35 with one end of the silencer 18, which may be a small, conventional muffler of the type used to muffle the exhaust noise of an internal combustion engine. This silencer 18, as best shown in FIG. 3, is supported on the base pan 30 by a pair of support brackets 37.

A suction type flexible hose 38 is connected to the inlet or low pressure side of the suction blower 14, and extends upwardly through a hole 39 (FIG. 3) provided therefor in the flat top of a rectangular base housing 40. The upper end of the hose 38 is removably fitted onto the lower end of the suction tube 15 incorporated axially in the vacuum tank 11. The hose 38 is of the annularly corrugated, axially resiliently extensible type to permit it to be easily connected and disconnected from the axial tube 15 of the vacuum tank.

The base housing 40, which is of sheet metal, is rectangular, and is of a size to receive the base pan 30 in fitted relation in the lower end thereof, where it is secured by screws 41. The housing 40 is provided with a screened vent 42 in each end thereof, and a pair of inverted U-shaped lifting handles 43, of metal rod are secured one on each end of the housing.

A grooved pulley 44 is mounted on the motor shaft 32, and, by means of a V-belt 45, drives a larger diameter grooved pulley 47 mounted on the shaft 48 of the liquid pump 23, which may be of conventional, eccentric vane or other suitable type. The specific type of liquid pump employed is not material to the invention, and the details thereof are, therefore, not illustrated or described herein.

The inlet or low pressure side of the liquid pump 23 is connected by conventional pipe fittings and a flexible suction hose 49 to the lower end of a flanged hose nipple 50, which is mounted in a hole provided therefor in the top of the base housing 40. A second flexible suction hose 51 is connected from a projecting upper portion of this hose nipple 50, to a suction tube 52, which is secured in a hole provided therefor in a top shoulder portion 53 of the liquid tank 10 and extends downwardly to a point adjacent the tank bottom so as to supply liquid contained within the tank 10 to the liquid pump 23.

The outlet of the liquid pump 23 communicates, through conventional pipe fittings, a flexible pressure type hose 54, and a back pressure type valve 55, with the lower end of the steam chamber 57 of the steam generator 24. The chmaber 57 is capable of withstanding high internal pressures, for example, of several hundred pounds, and preferably is made of corrosion resistant material, such as stainless steel. This chamber 57 is enclosed with a layer 58 of suitable heat insulative material, such as, for example, powdered alumina, contained within an outer metal shell 59, which is provided with a base plate 60 secured to the base pan 30.

Figures 8, 9:
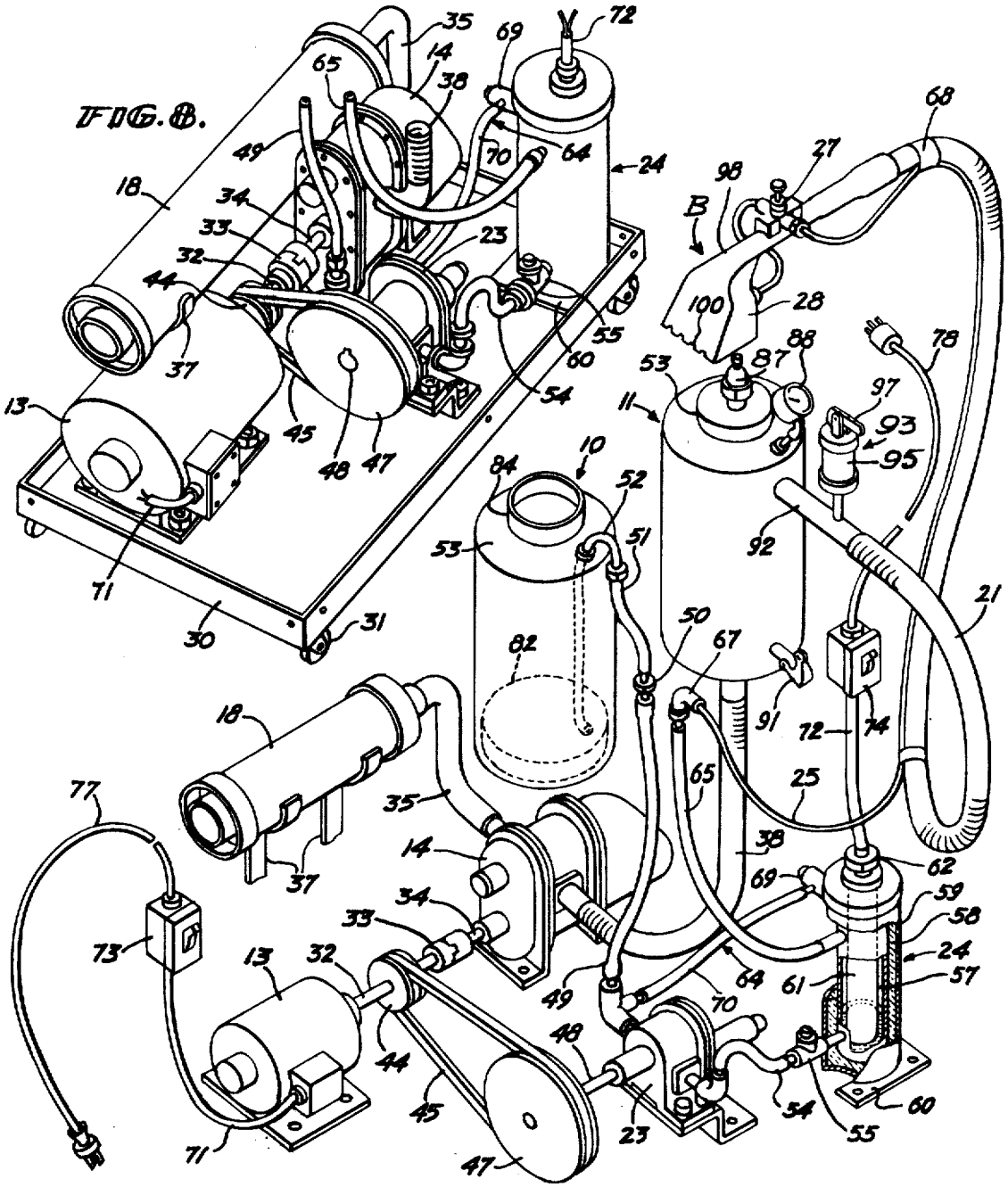
FIG. 8 is a perspective view of the base portion of the mechanism shown in FIGS. 1–7.
FIG. 9 is a partially exploded, diagrammatic, perspective view showing various parts of the illustrative form of the invention, the scale of the two tanks being relatively reduced.

Suitable heating means, such as a conventional electric resistance element 61 (FIG. 9) of suitable wattage is provided in the steam generating chamber 57, and is suitably encased to shield the heating element from solution and steam within the steam generating chamber 57. A conventional Calrod heating element is satisfactory for this purpose. The heating element 61 preferably is mounted to depend from a threaded plug 62, which is screwed in sealing relation into the correspondingly threaded upper end of the steam generating chamber 57 so as to prevent the escape therebetween of steam generated within the chamber 57.

The heating element 61 is spaced only slightly from its enclosing steam generating chamber 57 so that only a small quantity of liquid is present in chamber 57. The steam generating unit 24 thus acts as a flash type boiler, so that the liquid therein is vaporized into steam, and is super-heated rapidly to its required temperature and pressure. If desired, a conventional thermostat (not shown) may be provided to limit the maximum temperature of the steam in the steam generating unit 24, although this ordinarily will not be required, since even with the nozzle valve 27 closed for a substantial length of time the liquid pump 23 will provide a sufficient circulation of liquid through the steam generator 24, and a by-pass relief line 64 to prevent dangerous overheating.

From the upper end of the steam generating chamber 57 a flexible steam hose 65 is connected to an elbow fitting 67 mounted in a hole provided therefor in the top of the base housing 40, and from the projecting upper portion of this elbow 67 the flexible steam hose 25 communicates with the control valve 27 on the nozzle B. The steam hose 25, which is of small diameter as compared to the vacuum hose 21, preferably is attached at intervals to the vacuum hose as by encircling bands 68 of suitable material.

The by-pass line 64 comprises a conventional by-pass relief valve 69 screwed into a threaded opening provided therefor in the upper end of the steam generating chamber 57, and a steam hose 70 is connected from the outlet side of the relief valve 69 back into the inlet side of the liquid pump 23. A satisfactory setting for this relief valve is seventy-five pounds.

Conventional electrical conductor cords 71 and 72 electrically connect the motor 13 and heating element 61, respectively, to a pair of conventional electrical switches 73 and 74 mounted on top of the base housing 40. Conventional extension cords 77 and 78 are connected to the switches 73 and 74, respectively, for connection of these switches to a suitable source of electrical current for operating the drive motor 13 and the steam generator 24.

The two tanks 10 and 11 are seated on top of the base housing 40, and each tank is retained thereon by a pair of conventional spring plunger type hooks 79 of a well known type, each of which is mounted for universal pivotal movement on a plate 80 secured to the top of the base housing 40. Each hold down hook 79 engages a sheet metal loop 81 secured to project from the sides of the tanks 10 and 11 at a required height. For removing the tanks 10 and 11, or either of them, the spring biased upper portions of the plunger type hooks 79 are raised slightly to free the hook portions thereof from their metal loops 81, after which the plunger type hooks are swung outwardly clear of their metal loops.

The tanks 10 and 11 are both of the same size, and generally of the same external structure. Each comprises a conventional domed bottom 82, sealed into the lower end of a cylindrical wall 83 having a shoulder 53 and neck 84 formed on the upper end thereof. The upper end of the neck 84 on the liquid tank 10 is open, while that of the vacuum tank 11 is closed, and has a suction relief valve 87 mounted thereon. The suction relief valve 87 is so adjusted that when the pressure within the vacuum tank 11 drops below the pre-set minimum of the relief valve 87, the latter will open to permit atmospheric air to bleed in and thus limit the vacuum in the tank to the desired level. A conventional vacuum gauge 88 is mounted on the vacuum tank 11 to indicate the degree of vacuum therein.

Figure 5:
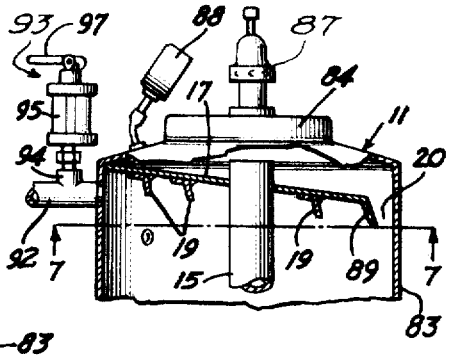
FIG. 5 is a fragmentary, sectional view taken along line 5—5 of FIG. 3.
Figure 6:
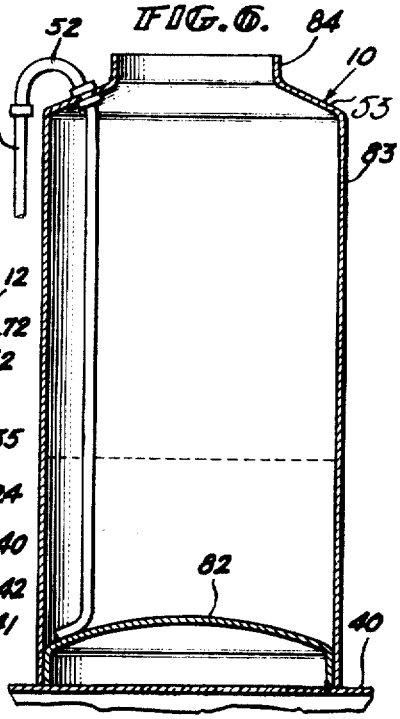
FIG. 6 is a fragmentary, sectional view taken along line 6—6 of FIG. 3.
Figure 4:
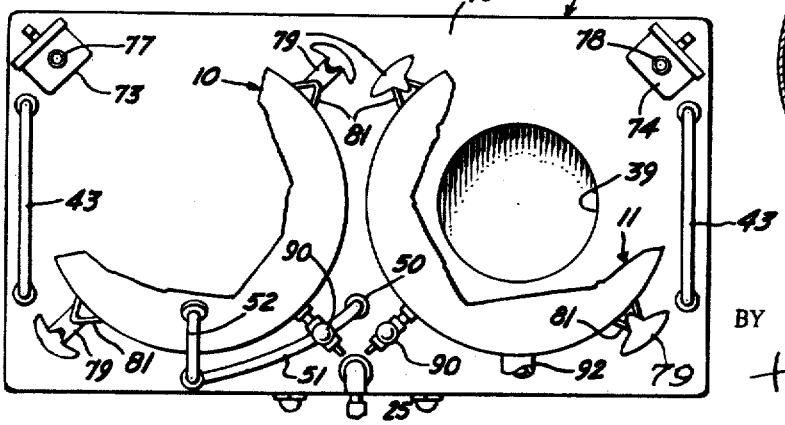
FIG. 4 is a top plan view of the mechanism of FIGS. 1 and 3, portions being broken away.
Figure 7:
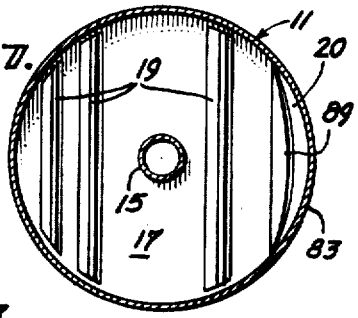
FIG. 7 is a transverse sectional view of the vacuum tank, taken along line 7—7 of FIG. 5.

The vacuum tank baffle 17, as best shown in FIGS. 3 and 5, comprises a substantially circular sheet metal disk of a size to fit snugly within the cylindrical tank wall 83. The baffle 17 is secured and sealed peripherally thereof to the tank wall 83 except for a downwardly bent portion 89 at its lower end, which is spaced from the tank wall 83 to provide the air passage 20 therebetween. The downwardly extending drip flanges 19 are secured transversely across the under side of the baffle 17 perpendicularly to its line of maximum slope, so as to cause liquid condensate flowing down the under side of the baffle to drop off and fall toward the bottom of the tank.

Conventional liquid sight gauges 90 are provided, one on each of the tanks 10 and 11, to show the liquid level in each thereof. A drain valve 91 is also provided at a low point in the vacuum tank 11 for draining condensate therefrom.

A suction inlet tube 92 for communicating the vacuum hose 21 with the interior of the vacuum tank 11 is a short length of metal tubing of a diameter to fit snugly into the inner end of the vacuum hose 21, and is fitted into and sealed in an opening provided therefor in the vacuum tank 11 directly below the high side of, and directed toward the underside of, the baffle 17.

A drip valve 93, which may be of the well known type used for feeding oil to the bearings of a large reciprocating type steam engine, is screwed into a threaded hole provided therefor in a boss 94 on the suction inlet tube 92. In use, the reservoir 95 of the drip valve 93 is filled with a suitable anti-foaming agent, and during use the valve 93 is opened by raising the cam finger 97 thereof to provide a constant dripping of such anti-foaming agent into the suction tube 92. There, this anti-foaming agent is picked up and entrained in the vapor-and-spray-laden stream of air flowing through the suction inlet tube 92 so as to counteract foaming of the condensate in the vacuum tank 11.

The suction tube 15 of the vacuum tank 11 preferably is fitted into central holes provided therefor in the baffle 17 and the vacuum tank bottom 82. The upper end of the tube 15 opens into the space between the baffle 17 and the top of the vacuum tank 11, while the lower end of this tube extends downwardly below the tank bottom. The flexible hose 38 from the inlet side of the suction blower 14, preferably is of an annularly corrugated type which is resiliently axially extensible. This hose 38 is fitted onto the projecting lower end of the tube 15 when mounting the vacuum tank 11 on the base housing 40, and is withdrawn therefrom when removing the tank.

The vacuum hose 21 which connects the nozzle B to the suction inlet tube 92 may be of any suitable type, and since numerous vacuum hoses suitable for this purpose are well known, and are in common use on vacuum cleaners and similar mechanisms, it will be unnecessary to illustrate or describe the details thereof herein.

The outer end of the vacuum hose 21 is fitted onto the tabular handle portion 98 of the nozzle B, and although the nozzle B itself is not a part of the present invention, it will be described briefly herein. The tubular handle duct 98 communicates through a preferably restricted passage 99 with the forward vacuum chamber 22 in the nozzle B. The nozzle steam chamber 29, of the same width as the forward vacuum chamber 22, is also formed in the nozzle B directly rearwardly of the vacuum chamber. The walls defining the two downwardly opening chambers 22 and 29 terminate on a common plane, and the exposed lower edges of these chamber walls are notched, as at 100, to permit a limited flow of atmospheric air into the vacuum chamber 22 in the event that the lower open end of the nozzle should be placed in full, overall contact with a flat, impervious surface.

The flow of pressurized steam from the steam hose 25 into the spray head 28 is controlled by the manually actuated steam control valve 27. The illustrated spray head 28 is of the well known type wherein a small diameter jet of fluid, in this case steam, is directed against an inclined, flat surface 101, whereby a fan shaped jet of the steam, together with any spray droplets carried thereby, are discharged down into the pile, nap or fabric of the material being cleaned.

In using the illustrated form A of the invention, the open side of the nozzle B is placed in as near overall contact with the material being cleaned as is practicable, and is drawn in a succession of strokes in the direction of the tubular handle 98, the nozzle preferably being removed from the material upon each return stroke away from the direction of the handle. Upon each operative stroke of the nozzle in the direction of the handle 98, the steam control valve 27 is opened to admit high pressure steam to the spray head 28, while upon the return strokes the valve 27 preferably remains closed. This action thoroughly cleans the rug or upholstery material being processed and leaves it substantially dry and undamaged. If desired, after the initial cleaning has been accomplished, the valve 27 may be permitted to remain closed and the nozzle B moved back and forth a few times over the cleaned area to suck air through it and thus further to dry it.

The operation of the illustrative form A of the invention is as follows:

With the mechanism A assembled and the nozzle B mounted thereon as shown in FIG. 1, the extension cords 77 and 78, are connected to a suitable source of electrical current. A supply of cleaning solution such as, for example, water with a suitable vaporizable cleaning material in solution therein, is poured into the open top of the liquid tank 10, the amount and type of solution used being determined by the nature of the cleaning job to be performed. With the drain valve 91 of the vacuum tank 11 closed, and the suction relief valve 87 and by-pass relief valve 69 set to desired settings, the switches 73 and 74 are closed to energize the drive motor 13 and the heating element 61.

With the motor 13 and steam generator 24 operating, the suction blower 14 rapidly reduces the pressure within the vacuum tank 11, which causes a partial vacuum in the suction hose 21. The size of the restricted passage 99 in the nozzle B is such as to limit the flow of atmospheric air therethrough below the capacity of the suction blower 14, so that where it not for the vacuum relief valve 87, the vacuum in the hose 21 would be greater than desirable. A suitable setting of the vacuum relief valve 87 is such as to maintain the vacuum in the tank 11 approximately 9 pounds below ambient atmospheric pressure.

With the mechanism thus operating and after a few moments have been allowed to permit the generation of steam in the chamber 57, the steam control valve 27 is opened for a sufficient length of time to purge and heat up the steam hose 25. The mechanism is then ready for operation.

The nozzle B is drawn in successive strokes across the material to be cleaned in the direction of the tubular nozzle handle 98, while at the same time operating the steam control valve 27 as required to direct the fan shaped steam jet from the spray head 28 into the material being cleaned. The dirt from the material being cleaned, together with steam and condensate of the cleaning solution used, and atmospheric air drawn through such material, is all sucked into the vacuum chamber 22 of the nozzle and passes thence through the vacuum hose 21 and is discharged through the suction inlet tube 92, where it picks up and carries with it anti-foaming material fed into the suction inlet tube by the drip valve 93.

This high velocity stream is discharged through the vacuum inlet tube 92 into the vacuum tank 11 and against the under side of the baffle 17. There, due to the relatively large size of the interior of the vacuum tank 11, and the fact that the baffle 17 and the air in this tank is relatively cool, due at least in part to convection transfer to, and conduction through the metal of the tank 11 and its baffle 17, any steam remaining in its vapor state in this incoming stream condenses out, and spray droplets of cleaning solution and anti-foaming material carried by this incoming stream impinge against and cling to the under side of the baffle 17.

Due to the inclination of the baffle from the horizontal, the liquid from these droplets collects and gravitates along the under side of the baffle toward its downturned lower edge 89 and the opening 20 between that edge and the vacuum tank wall 83. This dirt laden liquid flowing along the under side of the baffle gravitates downwardly along the drip flanges 19 to their lower edges, whence it drops off and falls toward the bottom of the vacuum tank 11. At desired intervals the collected condensate may be withdrawn from the vacuum tank 11 by opening the darin valve 91.

The reduction in air pressure in the portion of the vacuum tank 11 above the baffle 17 caused by the suction of air through the axial tube 15 draws air from the portion of the tank 11 below the baffle 17, upwardly around the downturned edge 89 of the baffle 17 and through the passage 20. Thence this air is drawn downwardly through the axial tube 15, and suction hose 38 into the inlet side of the suction blower 14. From the discharge side of the suction blower 14 this air is discharged through the hose 35 and the silencer 18 to the atmosphere.

When it is desired to remove either or both of the tanks 11 and 12 from the base housing 40, the spring biased plunger hooks 79 are raised free of their tank loops 81 and are swung outwardly, whereupon the tanks are free to be lifted off. In removing the vacuum tank 11, the latter is first tilted sufficiently to permit one's hand to be inserted beneath the uptilted lower edge thereof to withdraw the suction hose 38 from the lower end of the axial tube 15, thereby freeing the tank 11 for removal.

The invention provides a simple and highly effective mechanism for supplying high pressure steam and vacuum to a single nozzle for use in cleaning rugs, upholstery and other materials. The mechanism of the invention is compact, simple and relatively inexpensive to manufacture, and very effective and inexpensive to operate. It requires only a soure of suitable electrical current for its operation, and should it be desired to operate it at a point remote from a power line, a suitable portable electrical generator, driven for example by an internal combustion engine, can readily provide the necessary electrical power.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims.

1. A two-tank steam and vacuum generator for use with a two-chamber cleaning nozzle comprising:

a flat top base housing having a hole in the top at one side thereof, a drive motor mounted in the base housing, an air suction-blower mounted in the base housing, a liquid pump mounted in the base housing, drive means operatively connecting the motor to the suction-blower and to the liquid pump, a vacuum tank releasably mounted on top of the base housing over the hole therein, a baffle inclined from the horizontal mounted in the vacuum tank in downwardly spaced relation to its upper end, a passage being provided at the lower end of the baffle for communicating the portion of the interior of the vacuum tank above the baffle with that below the baffle, a suction tube extending upwardly through the bottom of the vacuum tank and the baffle, and sealed to both thereof, the upper end of the suction tube opening into the interior of the vacuum tank above the baffle, a flexible, resiliently extensible suction hose communicating the suction side of the suction blower with the lower end of the suction tube in the vacuum tank, a long, flexible vacuum hose having one end thereof opening into the vacuum tank directly below the higher side of the sloping baffle and directed toward the under side of the baffle, the other end of the vacuum hose being formed for releasable connection to a cleaning nozzle, a liquid-containing tank releasably mounted on the other side of the top of the base housing from the vacuum tank, a liquid supply line extending from a low point interiorly of the liquid tank to the intake side of the liquid pump for supplying liquid to the liquid pump, a steam generator connected to receive liquid pumped from the outlet of the liquid pump, and a flexible steam hose [of a length corresponding to that of the vacuum hose and] having one end thereof communicating with the steam generator and the other end thereof formed for connection to [such] said cleaning nozzle.

2. A two-tank steam and vacuum generator for use with a two-chamber cleaning nozzle comprising:

a housing, a drive motor mounted in the housing, an air suction-blower mounted in the housing, a liquid pump mounted in the housing, drive means operatively connecting the motor to the suction-blower and to the liquid pump, a vacuum tank releasably mounted on the housing, a baffle inclined from the horizontal mounted in the vacuum tank in downwardly spaced relation to its upper end, a passage being provided at the lower end of the baffle for communicating the portion of the interior of the vacuum tank above the baffle with that below the baffle, a plurality of downwardly directed drip flanges secured at laterally spaced intervals to the underside of the baffle and extending transversely to the line of maximum inclination of the baffle, duct means openly communicating the interior of the vacuum tank above the baffle with the intake of the suction-blower, a long, flexible vacuum hose having one end thereof opening into the vacuum tank directly below the higher side of the sloping baffle and directed toward the under side of the baffle, the other end of the vacuum hose being formed for releasable connection to one chamber of a two-chamber cleaning nozzle, a liquid-containing tank releasably mounted on the housing, a liquid supply line communicating low point interiorly of the liquid tank with the intake of the liquid pump for supplying liquid to the liquid pump, a steam generator connected to receive liquid pumped from the outlet of the liquid pump, and a flexible steam hose [of a length corresponding to that of the vacuum hose and] having one end communicating with the steam generator and the other end thereof formed for connection to a second chamber of [such] *said* two-chamber nozzle.

3. A two-tank steam and vacuum generator for use with a two-chamber cleaning nozzle comprising:

a housing, a drive motor mounted in the housing, an air suction-blower mounted in the housing and having an inlet and an outlet, a liquid pump mounted in the housing and having an inlet and an outlet, drive means operatively connecting the motor to the suction-blower and to the liquid pump, a vacuum tank mounted on the housing, a baffle dividing the interior of the vacuum tank into two portions, a passage being provided communicating the two portions of the interior of the vacuum tank with each other, a suction tube communicating the portion of the interior of the vacuum tank on one side of the baffle with the intake of the suction-blower, a long, flexible vacuum hose having one end thereof opening into the interior of the vacuum tank on the other side of the baffle, the other end of the vacuum hose being formed for releasable connection to one chamber of a two-chamber cleaning nozzle, a liquid-containing tank mounted on the housing, a liquid supply line extending from a low point interiorly of the liquid tank to the intake of the liquid pump for supplying liquid to the liquid pump, a steam generator connected to receive liquid pumped from the outlet of the liquid pump, and a flexible steam hose [of a length corresponding to that of the vacuum hose and] having one end thereof communicating with the steam generator[,] and the other end thereof formed for connection to the other chamber of [the] *said* two-chamber nozzle.

4. A two-tank steam and vacuum generator for use with a two-chamber steam-vacuum cleaning nozzle comprising:

a base housing, a suction-blower having an inlet and an outlet and mounted in the base housing, a liquid pump having an inlet and an outlet and mounted in the base housing, power drive means operatively connected to the suction-blower and to the liquid pump, a vacuum tank and a liquid tank releasably mounted on the base housing, a chamber in the upper portion of the vacuum tank and sealed from the lower portion of the vacuum tank except for an opening at one side thereof, a suction tube communicating the chamber in the upper portion of the vacuum tank with the inlet of the suction blower, a long, flexible vacuum hose having one end thereof opening into the portion of the vacuum tank below the chamber therein, the other end of the vacuum hose being formed for releasable connection to the cleaning nozzle, a liquid tight suction line extending from a low point interiorly of the liquid tank to the inlet of the liquid pump for supplying liquid to the liquid pump, a steam generator connected to receive liquid pumped from the outlet of the liquid pump, and a flexible steam hose [of a length corresponding to that of the vacuum hose and] having one end thereof communicating with the steam generator[,] and the other end thereof formed for connection to [such] *said* nozzle.

References Cited

The following references, cited by the Examiner, are of record in the patented file of this patent or the original patent.

UNITED STATES PATENTS

| | | | |
|---|---|---|---|
| 1,669,077 | 5/1928 | Brewer | 68—222 |
| 1,176,990 | 3/1916 | Scherff | 15—320 |
| 1,929,345 | 10/1933 | Brown et al. | 15—321 |
| 2,574,731 | 11/1951 | Dapprich | 68—18.2 |
| 2,908,030 | 10/1959 | Schuchman et al. | 15—322 |

FOREIGN PATENTS

| | | |
|---|---|---|
| 449,826 | 1/1913 | France. |
| 584,806 | 10/1959 | Canada. |

ROBERT W. MITCHELL, Primary Examiner